United States Patent
Kumar (10) Patent No.: US 9,654,346 B2
(45) Date of Patent: *May 16, 2017

(54) SYSTEM AND METHOD FOR AUTOMATICALLY DEPLOYING A NETWORK DESIGN

(75) Inventor: Brajesh Kumar, Noida (IN)

(73) Assignee: CA, Inc., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 12/874,774

(22) Filed: Sep. 2, 2010

(65) Prior Publication Data

US 2010/0325496 A1  Dec. 23, 2010

Related U.S. Application Data (63) Continuation of application No. 11/746,341, filed on May 9, 2007, now Pat. No. 7,814,192.

(51) Int. Cl.
*H04L 12/24* (2006.01)
*H04L 12/701* (2013.01)

(52) U.S. Cl.
CPC ........ *H04L 41/145* (2013.01); *H04L 41/0806* (2013.01); *H04L 41/0873* (2013.01); *H04L 41/12* (2013.01); *H04L 45/00* (2013.01); *H04L 41/082* (2013.01)

(58) Field of Classification Search
USPC ........ 709/220, 221, 223, 246; 715/735, 853; 370/238, 329
See application file for complete search history.

(56) References Cited

U.S. PATENT DOCUMENTS

| | | | | |
|---|---|---|---|---|
| 5,821,937 | A * | 10/1998 | Tonelli et al. | 715/853 |
| 5,950,011 | A * | 9/1999 | Albrecht | G06F 9/44505 713/1 |
| 6,418,123 | B1 * | 7/2002 | Kawakami | G06F 17/509 370/252 |
| 7,216,092 | B1 * | 5/2007 | Weber et al. | 705/26 |
| 7,441,021 | B1 * | 10/2008 | Perry | H04L 41/0806 345/33 |
| 2002/0075869 | A1 * | 6/2002 | Shah et al. | 370/389 |
| 2002/0135867 | A1 * | 9/2002 | Jackel | H01S 5/06835 359/337 |
| 2003/0050834 | A1 * | 3/2003 | Caplan | G06Q 30/02 705/14.14 |
| 2003/0101248 | A1 | 5/2003 | Tofinetti et al. | 709/223 |
| 2003/0131078 | A1 * | 7/2003 | Scheer | H04L 41/0213 709/220 |
| 2006/0047464 | A1 * | 3/2006 | Kumar | G06Q 30/06 702/122 |

(Continued)

*Primary Examiner* — Ninos Donabed
(74) *Attorney, Agent, or Firm* — Pillsbury Winthrop Shaw Pittman LLP (57) ABSTRACT

A system and method for automatically deploying a network design is provided. Design deployment may be automated by a system that receives a machine-readable network design as an input, validates design topology requirements, and automatically deploys the design over actual hardware elements without manual intervention. Thus, the system and method provided may eliminate errors and streamline network design deployment, which may be particularly useful in a network characterized by a complex design, which may be difficult and tedious to configure manually.

20 Claims, 4 Drawing Sheets

(56) References Cited

U.S. PATENT DOCUMENTS

| | | | |
|---|---|---|---|
| 2006/0073832 A1* | 4/2006 | Pfister | H04L 41/12 |
| | | | 455/446 |
| 2006/0106585 A1* | 5/2006 | Brown | G06F 8/20 |
| | | | 703/1 |
| 2006/0111880 A1* | 5/2006 | Brown | G06F 8/20 |
| | | | 703/1 |
| 2006/0182034 A1* | 8/2006 | Klinker et al. | 370/238 |
| 2006/0215666 A1* | 9/2006 | Shepherd | H04L 45/04 |
| | | | 370/400 |
| 2006/0251111 A1 | 11/2006 | Kloth et al. | 370/464 |
| 2006/0271341 A1* | 11/2006 | Brown | G06F 8/20 |
| | | | 703/1 |
| 2007/0013948 A1* | 1/2007 | Bevan | 358/1.15 |
| 2007/0025306 A1* | 2/2007 | Cox | H04L 41/0806 |
| | | | 370/338 |
| 2007/0076636 A1* | 4/2007 | Chow et al. | 370/258 |
| 2007/0113273 A1* | 5/2007 | Shafer et al. | 726/11 |
| 2008/0281947 A1 | 11/2008 | Kumar | 709/220 |

\* cited by examiner

SYSTEM AND METHOD FOR AUTOMATICALLY DEPLOYING A NETWORK DESIGN

CROSS-REFERENCE TO RELATED APPLICATIONS

This application is a continuation of U.S. patent application Ser. No. 11/746,341, entitled "System and Method for Automatically Deploying a Network Design," filed May. 9, 2007, which issued as U.S. Pat. No. 7,814,192 on Oct. 12, 2010, the contents of which are hereby incorporated by reference in their entirety.

FIELD OF THE INVENTION

The invention relates to network design, and in particular, to a system and method for automatically deploying a network design.

BACKGROUND OF THE INVENTION

The rapid pace of development in information technology has resulted in tremendous demand growth for large amounts of data storage. In order to reduce network loads, increase available bandwidth, and provide the infrastructure necessary to store these large amounts of data, network enterprises are increasingly employing specialized networks dedicated to storage, often referred to as a storage area network or a storage attached network (SAN). SAN implementations can provide streamlined solutions for archiving, backing up, and replicating data, among other things. For example, by providing a distinct high-speed network, dedicated for storage and backup, these types of networks can improve data management capabilities, access and availability of data, and the performance of supported systems, among other things.

In light of these storage demands, however, designing a proper storage solution for an enterprise requires acute awareness of existing infrastructure and other resources that may be impacted. Even when designing an enterprise storage solution from the ground up, issues such as future interoperability and efficiency are significant considerations. In spite of the benefits of dedicated storage network, difficulties often arise because hardware elements and drivers may be heterogeneous, or may be provided by a variety of vendors, or may be based on a wide variety of communication protocols and interface standards, among other things. Further, for various reasons, network organization, zoning parameters, load sharing, or other characteristics of a SAN may be changed or modified often. As such, soft deployment of a SAN network design (e.g., configuring settings and parameters thereof) can often present interconnectivity or interoperability issues, among other things, which must be properly dealt with. Moreover, effective enterprise operation should not suffer (e.g., due to downtime or other factors) simply because a network design is being updated (e.g., to incorporate new networking products, standards, and/or protocols, or to replace a failed devices, etc.). As a network design increases in scale, which is inevitable in large organizations, these problems become exacerbated, as deployment supervised solely by human operators tends to be tedious and error prone.

Existing systems suffer from these and other problems.

SUMMARY OF THE INVENTION

According to various aspects of the invention, a system and method for automating network design deployment is provided. Among other things, the invention may automate processes for deploying or configuring network infrastructure, validating interoperability or connectivity among devices, setting configuration parameters, and installing network management applications. In various implementations, a network design may include information to represent a layout of various devices, logical organizations of the devices, or otherwise. The network design may be schematically represented using eXtensible Markup Language (XML), or any other suitable format. The design may be deployed over a network automatically by validating physical device connections, and by issuing one or more hardware-specific commands to configure the devices in accordance with the network design.

According to various aspects of the invention, a network design may represent one or more hardware devices included in a network, configuration parameters for the devices, and/or a desired topology for the network, among various other things. A process of deploying the design may include discovering an actual topology or an existing design of the network, which may be used to validate the design being deployed. For instance, validation may include determining whether all hardware devices required by the network design have been properly installed, wired, or otherwise connected to the network. In various implementations, upon determining that one or more hardware devices are not properly installed, or otherwise not ready for deployment, a human operator (e.g., a network administrator), may be guided through an error correction process via a user interface. Further, the user interface may provide guidance for correcting errors that may arise during other stages of deployment, as would be apparent. Upon validating the network design, the network design may subsequently be deployed (e.g., by automatically performing soft configuration of the devices).

According to various aspects of the invention, a received network design may include a new design (e.g., for a new network, an unconfigured network, etc.), or the received design may modify or update an existing design (e.g., for a previously configured network). When the received design is a new design, various hardware-specific commands may be generated to deploy every aspect of the design over all hardware devices included in the design. When the received design is an updated design, however, the generated hardware-specific commands may be limited to those implementing differences between the received network design and the discovered design, thereby simplifying deployment to the fullest extent possible. Design deployment may be completed by executing the generated commands on the hardware devices, as appropriate. Upon execution the generated commands, the deployed network design may be tested. The testing may include a similar validation process as described above, except that the test may further include discovering logical data (e.g., zoning parameters, load balancing characteristics, etc.), in addition to hardware device (e.g., physical connectivity) information. If any errors occur, deployment may be repeated to correct the errors, including guiding an administrator through the correction. As such, by automating various processes involved in deploying a network design, a risk of human error may be reduced substantially, and responsibilities of a network administrator and/or engineer may be simplified.

Other objects and advantages of the invention will be apparent to those skilled in the art based on the following drawings and detailed description.

DETAILED DESCRIPTION

Figure 1:
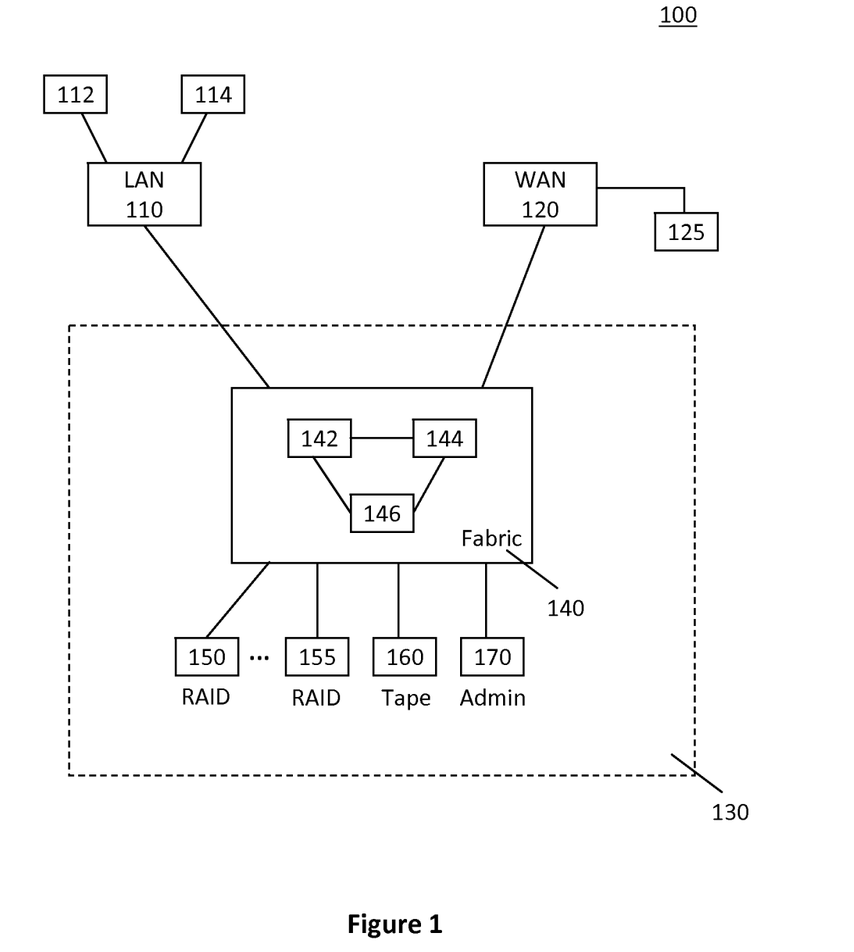
FIG. 1 illustrates a block diagram of an exemplary network enterprise according to various aspects of the invention.

Referring to FIG. 1, a block diagram of an exemplary network enterprise 100 is illustrated according to various aspects of the invention. Enterprise 100 may have all its storage needs serviced or otherwise supported by a storage area network (SAN) 130. SAN 130 may include a network fabric 140, which may interface or be interconnected to one or more local area networks 110, one or more wide area networks 120, one or more storage subsystems 150, 155, 160, and an administrator console 170, among other things. By way of example, local area network 110 may serve clients 112 and 114, while wide area network 120 may connect to a remote replication subsystem 125, or other systems. In various implementations, local area network 110 may serve additional clients, or be attached to a server, while wide area network 120 may connect to additional local area networks, to the Internet, or other networks, without limitation. Further, it will be apparent that networks associated with enterprise 100 may be implemented or designed in various different ways to serve the particular or unique needs of any given enterprise.

For example, among other things, a network design may be varied in response to changes in technology. For instance, a SAN generally requires high data transfer rates between storage devices, communication devices, end users, and other network elements in order to provide fast and reliable data access. Thus, a SAN can transfer data at rates approaching that of an attached volume by using technology that enables high data transfer rates (e.g., Fibre Channel technology), or further by using transport protocols commonly used for hard disks, tape drives, and other storage devices (e.g., Small Computer System Interfaces). Fibre Channel, however, only runs over twisted-pair copper wire or fiber optic cables, which in some cases may be prohibitively expensive. Thus, SAN administrators may turn to Internet Small Computer System Interface (iSCSI) technology, which has the advantage of running on simple Ethernet or TCP/IP networks. Thus, in various implementations, communication devices 142, 144, 146 may be Fibre Channel devices, iSCSI devices, or any other suitable combination of device types. Many different interfaces, standards, and/or configurations may be used (e.g., ATA over Ethernet, InfiniBand, etc.), and specific configurations, choices of technology, or other factors may change significantly over time. Thus, as interface technologies, communication protocols, and other technologies evolve, enterprises must respond to these changes in order to provide network solutions best suited for their particular needs.

Another significant issue facing network deployment is the scalability of the architecture, especially in larger networks. For instance, as shown in FIG. 1, a storage subsystem 150 may be an ATA or SCSI disk drive, storage subsystem 155 may be a redundant array of independent disks (RAID) subsystem, and storage subsystem 160 may be a tape backup system. However, any suitable combination of storage subsystems or devices may be used, as will be apparent. Moreover, it will be apparent that the combination of network devices may change in response to future technological developments, or enterprise needs, or other factors. Thus, as an enterprise infrastructure evolves, routers, switches, hubs, storage subsystems, or other devices may be added or removed, as necessary (e.g., additional routers or other devices may be added to a network to increase available bandwidth, or prevent overload, or for other reasons). Similarly, increased storage demands may necessitate attachment of additional storage subsystems or volumes, or substitution of storage devices having larger capacities, or otherwise. It will be apparent, therefore, that specific network implementations may vary in type, scale, or configurations, potentially leading to very complex installations.

Yet another issue in deploying a network design may include ensuring device interoperability, storage and network device configuration, data management (e.g., load balancing, data routing, etc.), organizing stored data, or managing network applications, among other things. For example, a network may be composed of devices from different vendors and/or manufacturers, where devices must be physically compatible in terms of interfacing and cabling, in addition to requiring compatibility between host operating systems and device firmware, among other things. Devices must be configured with aliases and/or IP addresses for identification on the network, in addition to requiring up-to-date drivers and/or firmware. The network may be administered to provide load balancing, optimal bandwidth utilization, alternate data paths, support for various protocols, resource allocation, in addition to any other network administration issue that may arise. SANs also have unique storage requirements because of the need to provide access to data in a similar way to an attached disk drive. For example, in various implementations, a storage device may be assigned a Logical Unit Number (LUN) owned by a single device. In another example, various devices may access the same data using Network Attached Storage (NAS) heads and clustering. Other storage-specific issues may include specifying RAID levels, ensuring file integrity, and scheduling tape backup. In addition, a network design may account for security, data encryption, virus protection, health monitoring, or update notifications, among many other things. Other features and configuration parameters will be apparent, and may be implemented without departing from the scope of the invention.

The various issues involved in network design deployment presented herein have been for exemplary purpose only; many additional deployment issues may arise and can be accounted for. Thus, although various exemplary designs for a network have been described in FIG. 1, it be will apparent that variations in technology, scale, configuration, management, or other things may lead to significant designs differences for any given network depending on the needs of an enterprise. Accordingly, manual deployment of a network design may be a very cumbersome process, prone to human error. The invention described herein may simplify these issues by automating design deployment, thereby making network design deployment a streamlined and efficient process.

Figure 2:
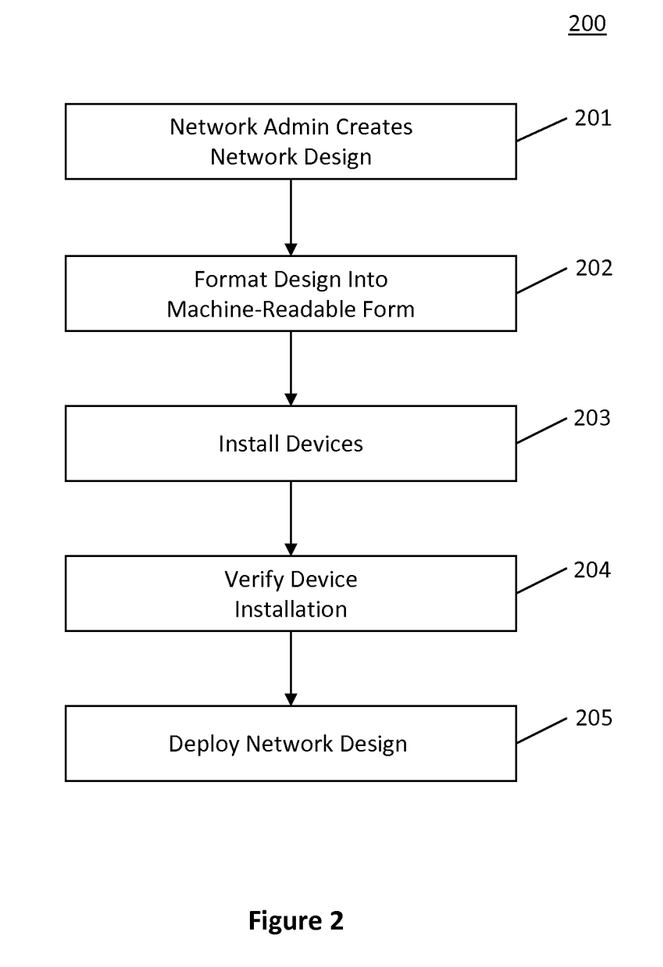
FIG. 2 illustrates a flow diagram of an exemplary process for creating a network design and preconfiguring a network for design deployment according to various aspects of the invention.

Referring to FIG. 2, an exemplary process 200 for creating a network design and preconfiguring a network for deployment is illustrated according to various aspects of the invention. In an operation 201, a network administrator creates a network design. The specifics of a network design may vary widely from one implementation to another, and may include, among other things, a set of hardware devices used in the design, configuration parameters for the hardware devices, or interconnection or logical layout of hardware devices (i.e., a network topology). In various implementations, a network design may be created using a design module (e.g., CA® BrightStor SAN Designer, or any other suitable design module). The design module may reduce the likelihood of input error by providing a graphical user interface (GUI), which a network designer may use to visualize a design environment. Further, the design module may be used to specify capabilities or characteristics of various devices or software, or provide to design rules to check for interoperability issues, among other things.

After the network design has been created in operation 201, process 200 may proceed to an operation 202, wherein the network design may be formatted into a machine-readable form. Various suitable techniques may be used to format a design, as will be apparent. For instance, the design module described above may be implemented with various utilities, modules, or other features that export or otherwise format a network design into a machine-readable form. For example, in various implementations, the design may be formatted using eXtensible Markup Language (XML), where the design may be represented schematically within an XML file or other suitable format. In another example, the network design may be represented by metadata, or any other suitable machine recognizable data format. Therefore, it will be apparent that various data formats may be used, and that various techniques for creating a machine-readable representation of a network design may be used without departing from the scope and spirit of the invention.

Upon creating the network design and formatting the design into a machine-readable form, an operation 203 may include physical installation of various hardware devices included in the network design. For instance, SAN hardware devices may be physically installed in operation 203, where physical installation may include rack mounting various hardware devices, providing power to the hardware devices, wiring, cabling, or otherwise interconnecting hardware devices, among various other things. Further, in various implementations, an installation module may be included to assist network administrators, engineers, and/or others during the installation process. For instance, the installation module may analyze a network design (e.g., as created and formatted in operations 201 and 202) to provide wiring diagrams, specify an order in which to connect various hardware devices, or to indicate how to cable, wire, or otherwise interconnect various devices, among other things. Furthermore, in various implementations, the installation module may include a troubleshooting feature that checks for incorrectly or improperly connected devices, or that provides assistance in resolving technical problems, among other things. It will be apparent, however, that various other features may be included to simplify physical installation, or that some network administrators, engineers, or others may possess sufficient knowledge to perform unassisted physical installation of devices.

Once all hardware devices specified by a network design have been installed, a validation module may subsequently verify correct installation and interconnection of devices in an operation 204. For example, as described in greater detail with reference to FIG. 3 below, validation of a network design may include ensuring that an actual topology of an installed network corresponds to topology specifications in the created network design. When validation operation 204 indicates that all physical devices have been properly installed, processing may proceed to an operation 205 for design deployment, as described in greater detail with reference to FIG. 4 below.

Figure 3:
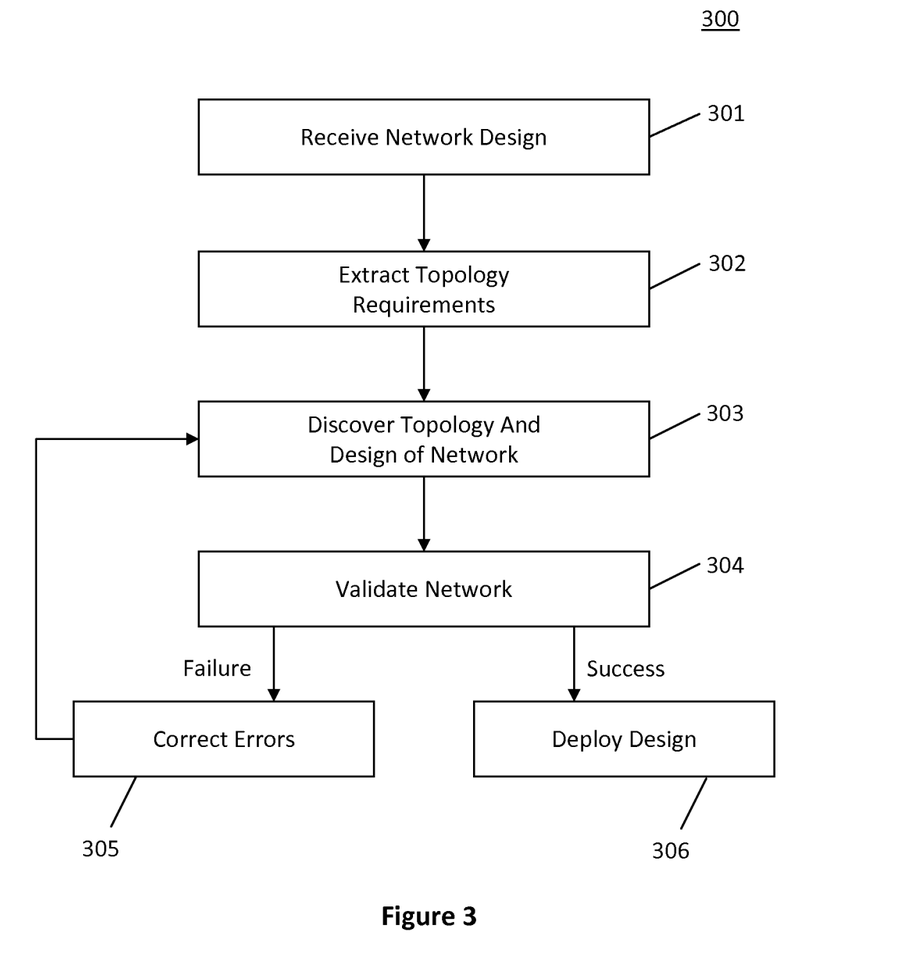
FIG. 3 illustrates a flow diagram of an exemplary process for validating a network design according to various aspects of the invention.

Referring to FIG. 3, an exemplary process 300 for validating a network design is illustrated according to various aspects of the invention. As described in greater detail in FIG. 2 above, a network design may be created and subsequently formatted into a machine-readable form (e.g., an XML schematic representation). The machine-readable design may then be provided to a validation module as an input in an operation 301. Subsequently, in an operation 302, the validation module may parse the design input, or otherwise performing any appropriate processing to extract topology specifications of the network design. For instance, topology specifications may include, among other things, various physical and/or logical aspects or characteristics of the network design (e.g., hardware devices which included in the design, interconnection of the devices, physical layouts, logical organizations, primary/backup nodes, or various other suitable topology features, as will be apparent).

Processing may then proceed to an operation 303, wherein an actual topology may be discovered. Discovering the actual topology may include scanning a network to identify various physical and logical characteristics of an existing, installed network (e.g., installed hardware devices, interconnection of installed devices, logical identifiers, or any other characteristic of a network). In various implementations, operation 303 may include discovering an existing design of an underlying network (e.g., when the created design updates the existing design). Thus, discovery operation 303 may also include identifying any existing configuration parameters, including version information, network identity, or storage asset properties, among various other things. Further, discovery operation 303 may also include identifying virtual objects for a network design, including zone organization, routing rules, load balancing rules, or redundant data paths, without limitation. As such, validation and discovery process 300 may identify any and all physical and/or logical information about a network design being deployed, as well as an existing or installed network or network design, where such information may be utilized during a deployment process, as described in greater detail with reference to FIG. 4 below. Further, it will be apparent that network design discovery has been described in exemplary terms only; it will be apparent, therefore, that the invention may be tailored to comprehensively discover any suitable aspect of a network.

Process 300 may then proceed to an operation 304, where the design topology specifications may be validated against the discovered topology. Validation operation 304 may therefore include comparing the design topology specifications to the discovered topology to verify that all hardware devices included in the design have been properly installed and/or interconnected (i.e., to verify that the network is physically ready for deployment). If validation operation 304 fails for any reason, process 300 may proceed to an operation 305 where appropriate action may be taken (e.g., by an administrator, engineer, etc.) to correct any identified installation issues. Error correction operation 305 may guide an administrator, engineer, or other user via a graphical user interface in order to correct the installation errors. For example, a network design may identify a particular host as having a cable attached thereto, and validation operation 304 may determine that the cable has not been connected to the host, or has been improperly attached thereto. As such, validation operation 304 may determine any problems with a physical network installation, and operation 305 may generate one or more messages to notify an administrator, engineer, or other user of the error (e.g., by displaying the messages), and appropriate action may be taken to correct the error (e.g., connect the cable). Once all installation issues have been addressed, process 300 may return to operation 303 to rediscover the existing network topology, and may subsequently return to operation 304 to reattempt validation. Discovery and validation processes may continue in this manner until the actual network topology corresponds to the design topology specified in the design being deployed. Upon such validation, processing may proceed to an operation 305 for design deployment.

Figure 4:
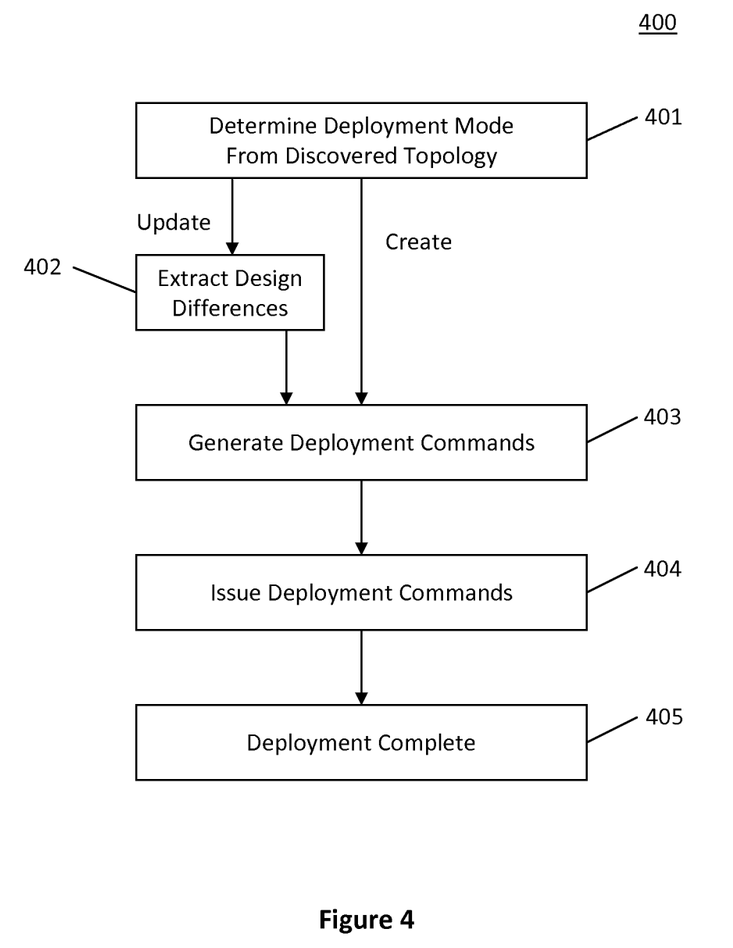
FIG. 4 illustrates a flow diagram of an exemplary process for deploying a network design according to various aspects of the invention.

Referring to FIG. 4, an exemplary process 400 for deploying a network design is illustrated according to various aspects of the invention. Deployment may be made more efficient by distinguishing between a new network design and an updated network design (e.g., when updating an established network). Therefore, network discovery information (e.g., as described in FIG. 3) may be used in an operation 401 that determines whether a deployment mode is a create mode or an update mode. In create mode, process 400 may jump to an operation 403, where various hardware-specific commands may be generated to perform soft deployment of a design by executing the commands on any appropriate devices. In update mode, however, a network may already be configured with an existing design, such that the design being deployed updates the existing design. Thus, in the update mode, an operation 402 may include identifying optimal design differences between the design being deployed and the existing design. For instance, identifying optimal design differences may include comparing discovered design characteristics to created design characteristics, thereby identifying differences therein.

Subsequently, in an operation 403, all information necessary to generate any appropriate hardware-specific commands to be used during deployment may be available. For example, in the create mode (i.e., a new design), various commands may be generated to configure each hardware device included in the network design. In the update mode, however, the generated commands may be limited to those implementing the optimal differences identified in operation 402. The generated commands may be used to implement any number of features, such as zoning, clustering, resource allocation, load balancing, configuring devices for interoperability, installing device plug-ins or other applications or software, or updating device drivers and/or firmware, among other things. It will be apparent that a design may include many other configuration characteristics, where the generated commands may be any suitable hardware-specific commands that may be optimized to execute on specific hardware devices. As such, the generated commands may be executed on the devices in an operation 304, thereby finalizing network design deployment and leaving the network ready for use.

Implementations of the invention may be made in hardware, firmware, software, or any combination thereof. The invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable storage medium may include read only memory, random access memory, magnetic disk storage media, optical storage media, flash memory devices, and others, and a machine-readable transmission media may include forms of propagated signals, such as carrier waves, infrared signals, digital signals, and others. Further, firmware, software, routines, or instructions may be described in the above disclosure in terms of specific exemplary aspects and implementations of the invention, and performing certain actions. However, those skilled in the art will recognize that such descriptions are merely for convenience and that such actions in fact result from computing devices, processors, controllers, or other devices executing the firmware, software, routines, or instructions.

Aspects and implementations may be described as including a particular feature, structure, or characteristic, but every aspect or implementation may not necessarily include the particular feature, structure, or characteristic. Further, when a particular feature, structure, or characteristic is described in connection with an aspect or implementation, it is understood that it is within the knowledge of one skilled in the art to effect such feature, structure, or characteristic in connection with other aspects or implementations whether or not explicitly described. It will also be apparent that storage area networks may be referred to by various other names (e.g., storage attached networks, SANs, etc.) without departing from the scope of the invention. Further, while the invention has been described in terms of storage networks, it will be apparent that any suitable network design (e.g., a local area network, wireless local area network, etc.) may be deployed using techniques described herein. Thus, various suitable changes and modifications may be made without departing from the scope and spirit of the invention. As such, the specification and drawings are to be regarded as exemplary only, and the scope of the invention to be determined solely by the appended claims.

What is claimed is:

1. A method for automatically deploying a network design, the method comprising:

receiving a network design at a computing device, wherein the network design includes a designed physical network topology of a plurality of hardware devices physically installed, or to be physically installed, in a network and a separate logical configuration to be deployed over the hardware devices in the network;

electronically discovering, by the computing device, an actual physical network topology of hardware devices that have been physically installed in the network, the discovering including identifying a physical interconnection among two or more physically installed hardware devices in the network;

validating that the actual physical network topology of physically installed hardware devices correctly corresponds to the designed physical network topology in the network design, wherein the validating includes determining that the identified physical interconnection matches a physical interconnection specified in the designed physical network topology in the network design;

deploying, by the computing device, the logical configuration over the plurality of physically installed hardware devices of the network responsive to validation that the actual physical network topology of physically installed hardware devices correctly corresponds to the designed physical network topology in the network design, wherein deploying the logical configuration over the network includes automatically executing a computer command to deploy the logical configuration over the physically installed hardware devices, the deployment involving setting or changing a logical configuration parameter of one or more selected from: network zoning, network clustering, network load balancing, network bandwidth utilization, network resource allocation, a network routing rule, a redundant or alternative network data path, a network identifier of one or more of the hardware devices in the network, and/or a RAID level of one or more of the hardware devices in the network; and electronically discovering a network parameter in the network having the deployed logical configuration and validating, based on the network parameter, that the deployed logical configuration on the network correctly corresponds to the logical configuration of the network design.

2. The method of claim 1, further comprising causing, by the computing device, display of an installation message prior to discovering the actual physical network topology of hardware devices that have been physically installed in the network, wherein the installation message includes an instruction that specifies how to physically install a hardware device, included in the designed physical network topology in the network design, in the network.

3. The method of claim 1, further comprising causing, by the computing device, display of an error message in response to determining that the actual physical network topology of physically installed hardware devices does not correctly correspond to the designed physical network topology in the network design, wherein the error message includes an instruction to resolve a physical installation problem associated with a physically installed hardware device.

4. The method of claim 3, further comprising, responsive to validating that the physical installation problem has been resolved such that the actual physical network topology of physically installed hardware devices correctly corresponds to the designed physical network topology in the network design, deploying, by the computing device, the network design over the network.

5. The method of claim 1, wherein the network design received at the computing device includes an updated network design that updates an existing network design previously deployed over the network.

6. The method of claim 5, further comprising identifying a difference between the logical configuration defined in the updated network design and an existing logical configuration associated with the existing network design.

7. The method of claim 6, wherein the command implements the difference between the logical configuration defined in the updated network design and the existing logical configuration associated with the existing network design such that the command reconfigures one or more of the physically installed hardware devices with the logical configuration defined in the updated network design.

8. A system to automatically deploy a network design, the system comprising:
a network having physically installed hardware devices; and
a computing device configured to:
receive a network design that includes a designed physical network topology of a plurality of hardware devices physically installed, or to be physically installed, in the network and a logical configuration to be deployed over the hardware devices in the network;
electronically discover an actual physical network topology of physically installed hardware devices in the network, wherein the discovery includes identification of a physical interconnection among two or more physically installed hardware devices in the network;
validate that the actual physical network topology of physically installed hardware devices correctly corresponds to the designed physical network topology in the network design, wherein the validation includes a determination that the identified physical interconnection matches a physical interconnection specified in the designed physical network topology in the network design;
deploy the logical configuration over the plurality of physically installed hardware devices of the network in response to validation that the actual physical network topology of physically installed hardware devices correctly corresponds to the designed physical network topology in the network design, wherein to deploy the logical configuration over the network, the computing device is further configured to automatically execute a command to deploy the logical configuration over the physically installed hardware devices, the deployment involving setting or changing a logical configuration parameter of one or more selected from: network zoning, network clustering, network load balancing, network bandwidth utilization, network resource allocation, a network routing rule, a redundant or alternative network data path, a network identifier of one or more of the hardware devices in the network, and/or a RAID level of one or more of the hardware devices in the network; and
electronically discover a network parameter in the network having the deployed logical configuration and validate, based on the network parameter, that the deployed logical configuration on the network correctly corresponds to the logical configuration of the network design.

9. The system of claim 8, further comprising an installation module configured to display an installation message prior to the computing device discovering the actual physical network topology of physically installed hardware devices, wherein the installation message includes an instruction that specifies how to physically install a hardware device, included in the designed physical network topology in the network design, in the network.

10. The system of claim 8, further comprising an installation module configured to display an error message in response to determining that the actual physical network topology of physically installed hardware devices does not correctly correspond to the designed physical network topology in the network design, wherein the error message includes an instruction to resolve a physical installation problem associated with a physically installed hardware device.

11. The system of claim 10, wherein the computing device is further configured to deploy the network design over the network in response to validating that the physical installation problem has been resolved such that the actual physical network topology of physically installed hardware devices correctly corresponds to the designed physical network topology in the network design.

12. The system of claim 8, wherein the network design received at the computing device includes an updated network design that updates an existing network design previously deployed over the network.

13. The system of claim 12, wherein to deploy the network design over the network, the computing device is further configured to identify a difference between the logical configuration defined in the updated network design and an existing logical configuration associated with the existing network design.

14. The system of claim 13, wherein the command implements the difference between the logical configuration defined in the updated network design and the existing logical configuration associated with the existing network design such that the command reconfigures one or more of the physically installed hardware devices with the logical configuration defined in the updated network design.

15. A method for automatically deploying a network design, the method comprising:
receiving a network design at a computing device, wherein the network design includes a designed physical network topology of a plurality of hardware devices physically installed, or to be physically installed, in a network and an updated logical configuration that updates an existing logical configuration previously deployed over hardware devices in the network;
electronically discovering, by the computing device, an actual physical network topology of hardware devices that have been physically installed in the network, the discovering including identifying a physical interconnection among two or more physically installed hardware devices in the network;
validating that the actual physical network topology of physically installed hardware devices correctly corresponds to the designed physical network topology in the network design, wherein the validating includes determining that the identified physical interconnection matches a physical interconnection specified in the designed physical network topology in the network design;
deploying the logical configuration over the plurality of physically installed hardware devices of the network in response to validation that the actual physical network topology of physically installed hardware devices correctly corresponds to the designed physical network topology in the network design, wherein deploying the logical configuration over the network includes:
identifying a difference between the updated logical configuration and the existing previously deployed logical configuration; and
automatically executing a computer command to deploy the updated logical configuration over the physically installed hardware devices, wherein the command implements the difference between the updated logical configuration and the existing previously deployed logical configuration such that the command reconfigures one or more of the physically installed hardware devices with the updated logical configuration and the deployment involves setting or changing a logical configuration parameter of one or more selected from: network zoning, network clustering, network load balancing, network bandwidth utilization, network resource allocation, a network routing rule, a redundant or alternative network data path, a network identifier of one or more of the hardware devices in the network, and/or a RAID level of one or more of the hardware devices in the network; and
electronically discovering a network parameter in the network having the deployed logical configuration and validating, based on the network parameter, that the deployed logical configuration on the network correctly corresponds to the logical configuration of the network design.

16. The method of claim 15, further comprising causing, by the computing device, display of an instruction to resolve a physical installation problem associated with the physically installed hardware devices in response to determining that the actual physical network topology associated with the physically installed hardware devices does not correctly correspond to the designed physical network topology in the network design.

17. The method of claim 16, wherein the computing device deploys the network design over the network in response to validating that the physical installation problem has been resolved such that the actual physical network topology of physically installed hardware device correctly corresponds to the designed physical network topology in the network design.

18. A system to automatically deploy a network design, wherein the system comprises:
a computing device having a memory and having a processor system configured to:
receive a, network design that includes a designed physical network topology of a plurality of hardware devices physically installed, or to be physically installed, in a network and an updated logical configuration that updates an existing logical configuration previously deployed over hardware devices in the network;
electronically discover an actual physical network topology of hardware devices that have been physically installed in the network, wherein the discovery includes identification of a physical interconnection among two or more physically installed hardware devices in the network;
determine that the actual physical network topology of physically installed hardware devices correctly corresponds to the designed physical network topology in the network design, wherein the determination includes a determination that the identified physical interconnection matches a physical interconnection specified in the designed physical network topology in the network design;
identify a difference between the updated logical configuration and the existing previously deployed logical configuration in response to determination that the actual physical network topology of physically installed hardware devices correctly corresponds to the designed physical network topology in the network design;
automatically execute a computer command that reconfigures one or more of the physically installed hardware devices with the updated logical configuration in response to the actual physical network topology of physically installed hardware devices correctly corresponding to the designed physical network topology in the network design, wherein the command implements the difference between the updated logical configuration and the existing previously deployed logical configuration to deploy the updated logical configuration over the physically installed hardware devices and the reconfiguration involves setting or changing a logical configuration parameter of one or more selected from: network zoning, network clustering, network load balancing, network bandwidth utilization, network resource allocation, a network routing rule, a redundant or alternative network data path, a network identifier of one or more of the hardware devices in the network, and/or a RAID level of one or more of the hardware devices in the network; and electronically discover a network parameter in the network having the deployed logical configuration and validate, based on the network parameter, that the deployed logical configuration on the network correctly corresponds to the logical configuration of the network design.

19. The system of claim 18, wherein the processor system is further configured to display an instruction to resolve a physical installation problem associated with the physically installed hardware devices in response to determining that the actual physical network topology associated with the physically installed hardware devices does not correctly correspond to the designed physical network topology in the network design.

20. The system of claim 19, wherein the processor system is further configured to automatically execute the command that reconfigures one or more of the physically installed hardware devices with the updated logical configuration in response to validating that the physical installation problem has been resolved such that the actual physical network topology of physically installed hardware devices correctly corresponds to the designed physical network topology in the network design.

* * * * *